United States Patent [19]

Peltier

[11] Patent Number: 5,617,522
[45] Date of Patent: Apr. 1, 1997

[54] METHODS AND APPARATUS FOR PROVIDING AND/OR CUSTOMIZING DISPLAY SCREENS AND OPERATOR INTERFACES FOR PROCESS CONTROL AND MEASUREMENT INSTRUMENTS

[75] Inventor: Richard R. Peltier, Norristown, Pa.

[73] Assignee: Honeywell Inc., Minneapolis, Minn.

[21] Appl. No.: 415,324

[22] Filed: Apr. 3, 1995

[51] Int. Cl.$^6$ .................................................. G06T 11/00
[52] U.S. Cl. .......................................... 395/133; 395/326
[58] Field of Search .......................... 395/133, 153–161, 395/600, 650, 903, 906

[56] References Cited

U.S. PATENT DOCUMENTS

| | | | |
|---|---|---|---|
| 5,134,574 | 7/1992 | Beaverstock et al. | 364/131 X |
| 5,398,336 | 3/1995 | Tantry et al. | 395/600 |

FOREIGN PATENT DOCUMENTS 0272078  6/1988  European Pat. Off. .

OTHER PUBLICATIONS

"User Interface Considerations in Avionics Development For The Boeing 777", Gomer et al., 1993, pp. 53–59.

*Primary Examiner*—Almis R. Jankus
*Attorney, Agent, or Firm*—Joseph J. Kaliko

[57] ABSTRACT

Methods, together with apparatus for implementing such methods, for providing display screens and operator interfaces for process control and measurements, comprising the steps of (a) graphically defining and generating Display Libraries that can be used by a stand alone process control and/or process measurement instrument containing an interpretation engine (a software task designed to interpret Display Definitions) to actually render displays and control their appearance and behavior during real time process operations; and (b) interpreting the contents of the aforesaid Display Definitions (using said interpretation engine) during the normal operation of a stand alone instrument, thereby rendering displays having the defined appearances and behaviors. By using the invention, display screens and operator interface controls can be created, provided to and executed on a wide range of user process control and measurement instruments which run on platforms that are otherwise incapable of supporting a display editor.

21 Claims, 8 Drawing Sheets

METHODS AND APPARATUS FOR PROVIDING AND/OR CUSTOMIZING DISPLAY SCREENS AND OPERATOR INTERFACES FOR PROCESS CONTROL AND MEASUREMENT INSTRUMENTS

BACKGROUND OF THE INVENTION

1. Field of the Invention

The invention relates generally to methods and apparatus used for graphically defining display screens and operator (man-machine) interface control for computing systems.

More particularly, the invention relates to methods and apparatus for (a) graphically defining and generating a "Display Library" (to be defined hereinafter) that can be used by a stand alone process control and/or process measurement instrument containing an interpretation engine (a software task designed to interpret Display Definitions) to actually render displays and control their appearance and behavior during real time process operations; and (b) interpreting the contents of the aforesaid Display Libraries (using said interpretation engine) during the normal operation of a stand alone instrument, thereby rendering displays having the defined appearances and behaviors.

By using the invention, display screens and operator interface controls can be created, provided to and executed on a wide range of user process control and measurement instruments which run on platforms that are otherwise incapable of supporting a display editor.

2. Definitions a) "Appearance" is defined herein to include at least the following items for every category of defined Display Object, where said categories include bar charts, trends, numerics, text, geometric shapes, pictures, etc.: position, size, foreground color and background color of a given Display Object. In addition, depending on the specific type of Display Object involved, further appearance parameters may be included, such as font size for a text object, etc.

b) "Taught Behavior" is defined herein as a context sensitive (e.g., manual mode versus auto mode, etc.) response(s) to a single external event (such as an operator depressing a button, an alarm going off, etc.), i.e., what happens if a given button is pressed, if a given alarm goes off, etc.

c) "Inherent Behavior" is defined herein to be a response that is associated with a specific type of Display Object, such as bar charts, trends, numerics, text, geometric shapes, pictures, etc. For example, with number object an up arrow button being depressed is predefined to increment the numeric data source for the number referenced by that object. It should be noted that a Taught Behavior may override an inherent behavior; i.e, when an increment button is depressed it can be taught to ignore that event or take some other action (according to the preferred embodiment of the invention Taught Behavior gets priority of Inherent Behavior).

d) "Custom Procedural Logic" is a run time interpretable program presented in the form of data to a Display Definition interpretation engine. Such program may be used to process data, including performing calculations and taking conditional steps, based on real time data inputs.

e) A "Data Source Identifier" is defined herein to include a description of what to access; for example, a real time process value within a instrument's dynamic data base, text from within a static text library (created, according to the preferred embodiment of the invention, via the display editor used to create the aforementioned Display Definitions), information from another Display Object, etc.

f) A "Display Object" is defined herein to be a set including one of more of the following types of information:
  (1) Appearance;
  (2) Taught Behaviors;
  (3) Custom Procedural Logic;
  (4) A Data Source Identifier; and/or
  (5) Other (contained) Display Objects.

g) A "Display Definition" is a data set (as opposed to executable code) defined herein to mean an interpretable collection (or list) of Display Objects.

h) A "Display Library" is defined herein to be a collection of one or more Display Definitions together with the aforementioned static text library.

i) "Rendering" a display is defined herein to mean activating and cyclically updating (i.e., at the display refresh rate) the collection of Display Objects contained within a given display.

When interpreted by the aforementioned interpretation engine, the Display Library, in the instrument run time environment, constitutes the complete operator interface for that instrument.

3. Description of the Related Art

Methods and apparatus for defining graphically display screens and operator (man-machine) interface control for computing systems such as PC's, main frames, etc., (where the apparatus takes the form of a programmable device utilizing such methods), are known in the art. For example, a commercially available set of such methods is embodied in the "Dataview" software, produced by UFO Systems, Inc. and sold with the "Micromax" product sold by Leeds & Northrup.

While such methods and apparatus are effective for certain hardware platforms, such as the aforementioned PC's, main frames, etc.; they are ineffective for platforms having limited processing resources, memory, keyboard limitations or devices utilizing fixed segment display (such as LED displays), etc., typified by platforms which support process control and process measurement instrumentation.

Those skilled in the art will recognize that it is possible to implement special purpose programs which are specifically designed to run on platforms having limited processing resources, etc., for providing display screens and operator interfaces for without the benefit of an editor. For example, the Leeds & Northrup 25,000 Chart Recorder includes displays hard coded as executable programs (embedded code) written in both assembly language or "C" code installed in Read Only Memory (ROM), in the aforementioned chart recorder.

This approach to providing displays and operator interfaces does not permit immediate graphical feedback while designing and/or defining the displays (as opposed to the feedback provided when, for example, designing displays using a display editor); the programming effort itself is tedious; and it is not be possible to download modified or customized display definitions to target instruments without removing, reprogramming and replacing ROM.

Accordingly, it would be desirable to provide methods and apparatus for graphically defining and generating Display Libraries that can be used by a wide range of stand alone process control and/or process measurement instruments not having the system resources available to support a display editor.

Furthermore, it would be desirable to provide methods and apparatus for actually rendering displays and controlling their appearance and behavior during real time process operations, via a means for interpreting the contents of the aforesaid Display Libraries, along with real time data inputs and user inputs, on platforms incapable of supporting a display editor.

Still further, it would be desirable to provide displays and operator interfaces which can be designed by a process that permits immediate graphical feedback while designing and/or defining the displays; and which easily and conveniently permits Display Libraries to be modified, replaced, customized and/or augmented after initial installation in a target instrument without having to remove, replace and reprogram ROM.

SUMMARY OF THE INVENTION

Accordingly it is an object of the invention to provide methods and apparatus for graphically defining and generating Display Libraries that can be used by a wide range of stand alone process control and/or process measurement instruments not having the system resources available to support a display editor.

Furthermore, it is an object of the invention to provide methods and apparatus for actually rendering displays and controlling their appearance and behavior during real time process operations on platforms incapable of supporting a display editor.

Still further, it is an object of the invention to provide displays and operator interfaces which can be designed by a process that permits immediate graphical feedback while designing and/or defining the displays; and which easily and conveniently permits Display Libraries to be modified, replaced, customized and/or augmented after initial installation in a target instrument without having to remove, replace and reprogram ROM.

According to one aspect of the invention, a method for providing display screens and operator interfaces for process control and measurement instruments, comprises the steps of: (a) graphically defining and generating a Display Library, utilizing a graphical display editor, wherein the Display Library is suitable for use by a process control and/or process measurement instrument, not capable of executing the graphical display editor; (b) providing the Display Library to an instrument; and (c) interpreting the contents of the Display Library provided to the instrument, utilizing an interpretation engine resident in the instrument, wherein the interpretation engine runs during the operation of the instrument in order to render a given display.

According to an alternate characterization of the invention a method for providing display screens and operator interfaces for process control and measurement instruments wherein the display screens and operator interfaces are generated on a first device and are subsequently input to and interpreted on a second device, capable of being decoupled from and run independently with respect to the first device, wherein the second device lacks the system resources to support a display editor, comprises the steps of: (a) generating a Display Definition utilizing the first device; (b) providing the Display Definition to the second device in the form of an interpretable, non-executable data set; (c) interpreting the Display Definition within the second device; and (d) rendering the desired display in response to Display Definition.

Yet another embodiment of the invention is directed to apparatus for providing display screens and operator interfaces for process control and measurement instruments, comprising: (a) means for graphically defining and generating a Display Library, including a graphical display editor, wherein the Display Library is suitable for use by a process control and/or process measurement instrument, not capable of executing the graphical display editor; (b) means for providing the Display Library to an instrument for controlling a process and/or measuring process data; and (c) means for interpreting the contents of the Display Library provided to the instrument, wherein the means for interpreting is resident in the instrument and runs during the operation of the instrument in order to render a given display.

Still another embodiment of the invention is directed to a method for providing display screens and operator interfaces for a process control and/or measurement instrument not capable of executing a graphical display editor, comprising the steps of: (a) providing a Display Library to the instrument; and (b) interpreting the contents of the Display Library provided to the instrument, utilizing an interpretation engine resident in the instrument, wherein the interpretation engine runs during the operation of the instrument in order to render a given display.

The invention features the ability to provide field instrument upgrades without requiring hardware or firmware (ROM) modifications. The invention also features the ability to support concurrent multiple languages (e.g., English, French, etc.), i.e., switch from one language to another on-line by allowing virtue of the fact that according to a preferred embodiment of the invention the text Display Objects do not contain actual text but merely reference to it (such that the interpretation engine can apply a given reference to selected language). Still further the invention provides a reduced display development cost for process control and measurement instruments (compared with the aforementioned hard coding approach to display development), by featuring a user friendly approach to the design and development of instrument displays and operator interfaces.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

Figure 1:
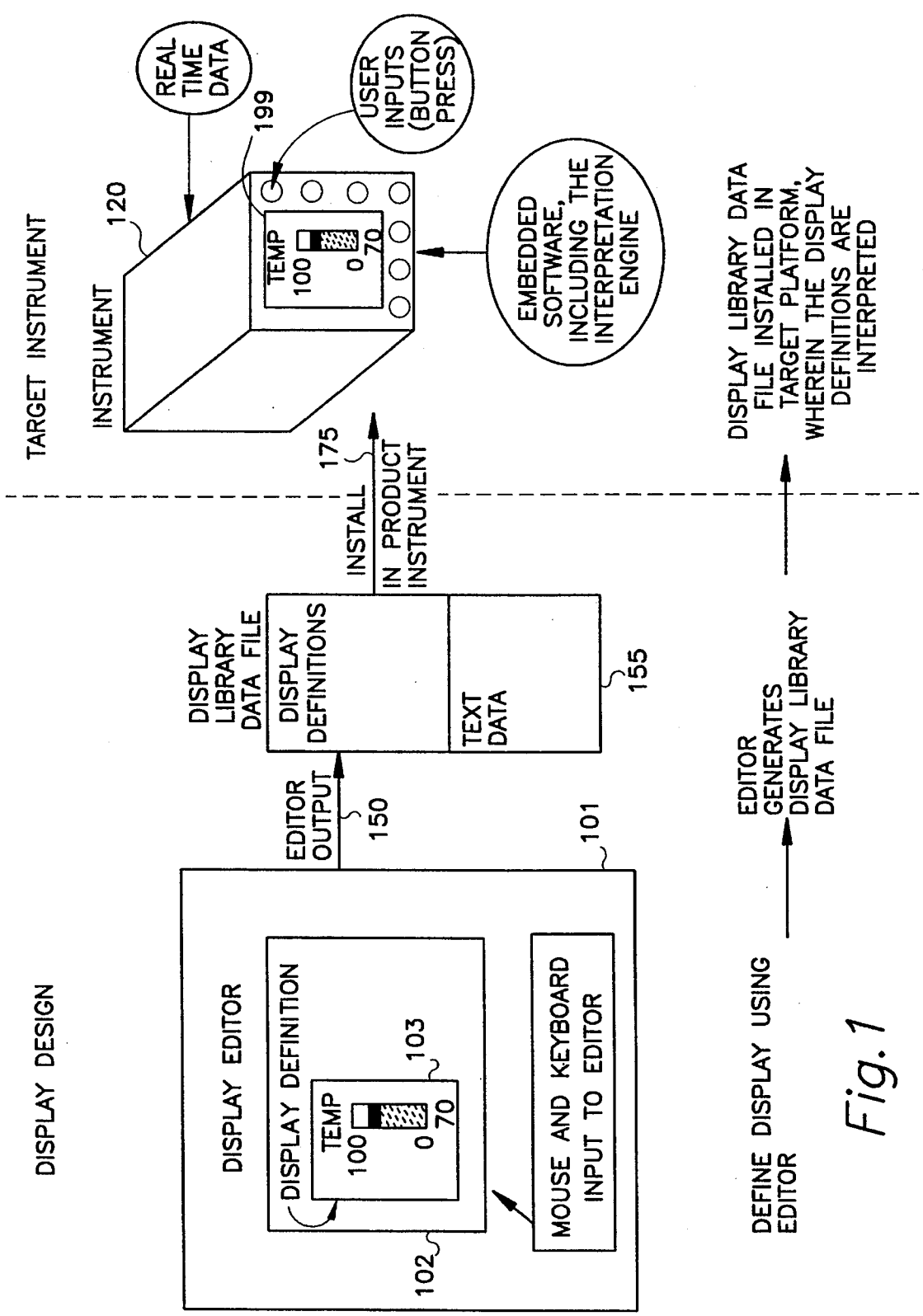
FIG. 1 depicts an overview of a process contemplated by a preferred embodiment of the invention, in which apparatus for defining displays and creating a Display Library data file in one processing environment is depicted along with apparatus (in the form of a target instrument constituting a second processing environment) which can use such a Display Library data file when made available to an embedded software platform (embedded into a process control and/or measurement instrument), which includes a Display Library interpretation engine.

Reference should now be made to FIG. 1 which, as indicated hereinabove, depicts an overview of a process contemplated by a preferred embodiment of the invention.

In particular, FIG. 1 depicts PC 101 (such as any commercially available IBM compatible personal computer ("PC"), which, according to the illustrative embodiment of the invention depicted in FIG. 1, accepts inputs from a mouse and/or a keyboard that may be processed by a graphical display editor running on PC 101 ("IBM" is a registered trademark of the International Business Machines Corporation).

Graphical display editors suitable for running on a PC, such as PC 101, are generally well known in the art and include, for example, the Dataview graphical display editor software referred to hereinbefore. Although graphical editing techniques per se are well known, there is no known editor which generates the type of Display Library data file having the format and content of a Display Library data file as defined hereinbefore.

The content and format of a Display Library data file suitable for use in accordance with the teachings of the present invention will be described hereinafter with reference to FIGS. 2–3 (FIG. 1 illustrates one such Display Library data file as file 155 (Editor Output 150); where the data file is shown to include a set of Display Definitions and associated text data).

Those skilled in the art will recognize that the format and content of the desired Display Library data file (tailored to meet the requirements of a "mirror image" interpretation engine running on a target instrument; and vice versa) will fully and completely describe the graphical editing steps necessary to produce such file.

Accordingly, given the state of graphical editing in general and the capabilities of those skilled in the art, no further description of the editor per se (used to generate Display Libraries on PC 101, such as the Display Library depicted in FIGS. 2–3) will be set forth hereinafter, except to say that the invention can (for example) be implemented by a Windows based software package that facilitates the interactive creation of the Display Definitions used to control product displays Referring again to FIG. 1, a display screen, 102, is shown to include exemplary display 103 which may be characterized (represented) in the form of a Display Definition created by the editor used to produce the desired Display Library (simply referred to hereinafter as the "editor").

In fact, according to a preferred embodiment of the invention, the editor running on PC 101 may be used to generate the desired Display Library data file in a first processing environment (PC 101); and the data file can subsequently be made available to a target instrument, such as the depicted instrument 120 (which constitutes a second processing environment), via a communications link (such as link 175 shown in FIG. 1), removable media (such a portable diskette not shown), installation in pre-programmed ROM, etc., where the Display Library data file is (according to the teachings of the invention) made available to the software platform embedded into instrument 120.

Although instrument 120 may not be capable of supporting a graphical display editor in the its processing environment (the aforementioned second processing environment); according to the invention, the embedded software platform is designed to include the aforementioned "mirror image" Display Library interpretation engine.

Interpretation engines in general, like the graphical display editors that create the data sets interpreted by such engines, are also well known by those skilled in the art. Once the format and content of the data set to be interpreted are known, those skilled in the art can build a suitable interpretation engine that reacts, to among other things, real time data inputs (such as process data per se), user inputs (such as a button on the instrument panel being depressed, etc.), as well as the contents of the Display Library Data file. The process steps used, in accordance with a preferred embodiment of the invention, for interpreting the contents of a Display Library utilizing an instrument resident interpretation engine, is described in detail hereinafter with reference to FIGS. 6–7.

Figure 2:
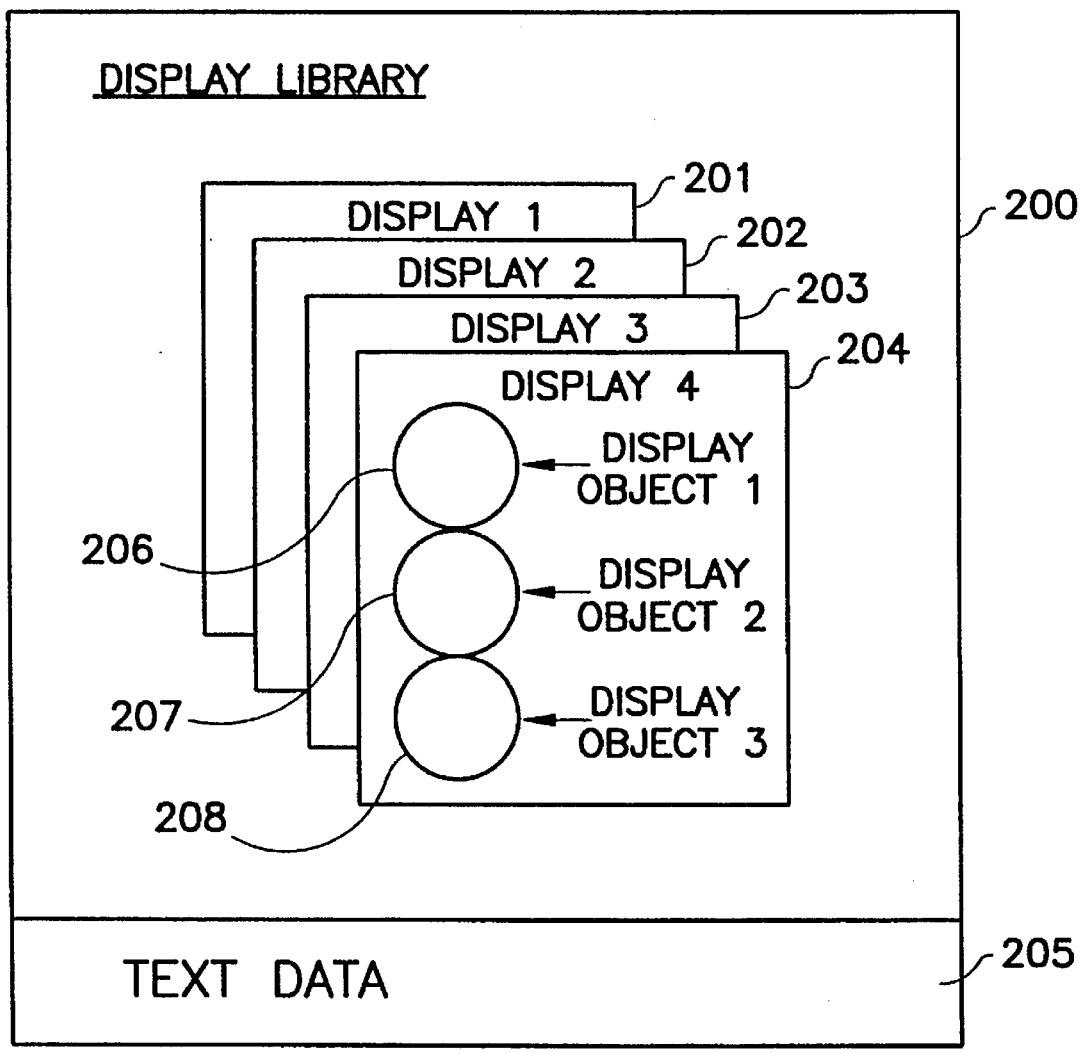
FIG. 2 depicts an exemplary Display Library data file of the type suitable for processing by the interpretation engine embedded in a software platform included in a process control and/or measurement instrument of the type contemplated by the invention.
Figure 3:
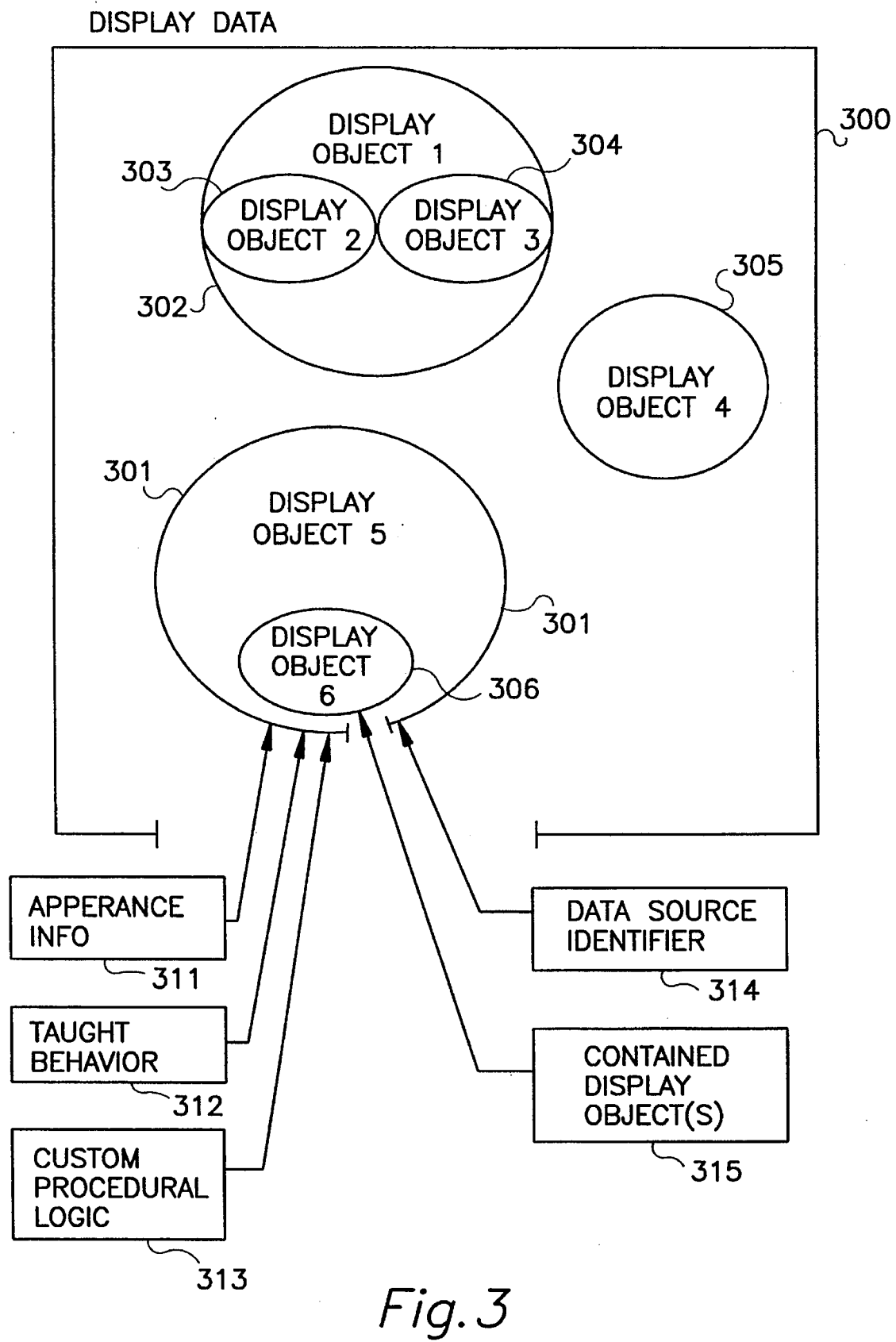
FIG. 3 depicts an exemplary Display Definition (contained in the exemplary Display Library depicted in FIG. 2) and the contents of a representative Data Object included in the Display Definition.
Figure 6:
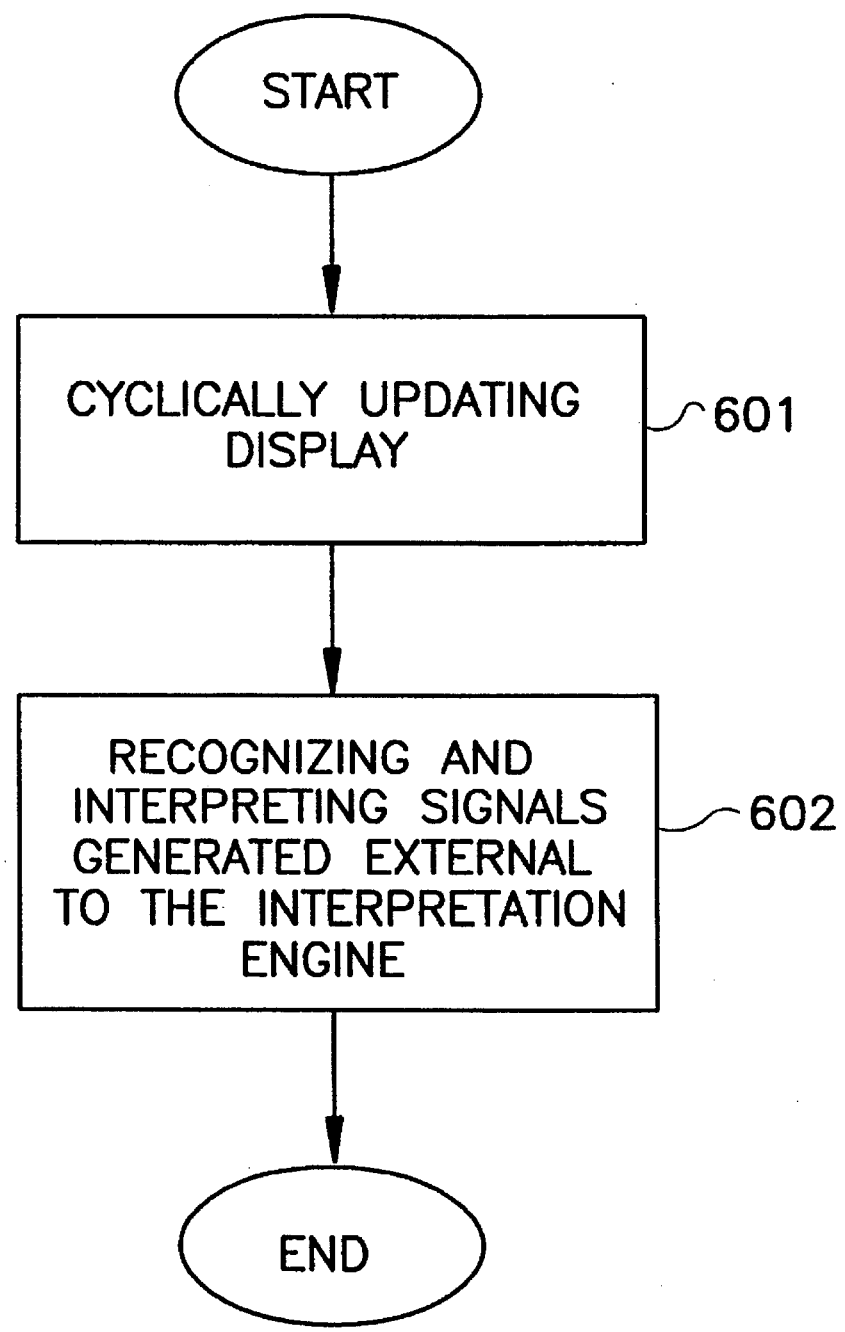
FIG. 6 depicts in the form of a flow chart a more detailed illustration of process steps used, in accordance with a preferred embodiment of the invention, for interpreting the contents of a Display Library utilizing an instrument resident interpretation engine.
Figure 7:
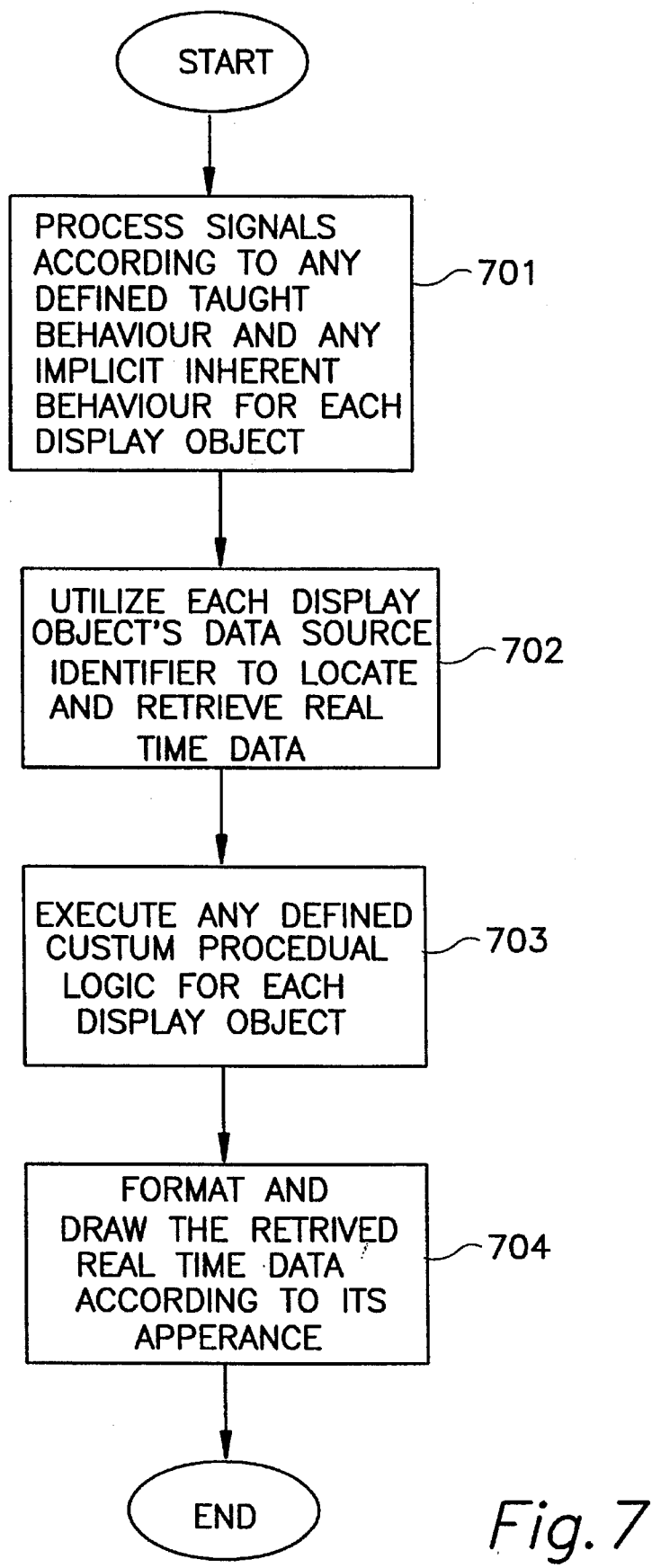
FIG. 7 depicts in the form of a flow chart a more detailed illustration of process steps used, in accordance with a preferred embodiment of the invention, for recognizing and interpreting signals generated external to an instrument resident interpretation engine.

Since the format and content of the Display Library data file contemplated by the invention is described in detail herein with reference to FIGS. 2–3, and the process steps used (in accordance with a preferred embodiment of the invention) for interpreting the contents of a Display Library (utilizing an instrument resident interpretation engine), along with steps for performing other interpretation engine functions of significance, are described herein with reference to FIGS. 6–7; no further description of the interpretation engine per se will, or needs to be, set forth hereinafter to enable those skilled in the art to practice the invention.

It should be noted that FIG. 1 illustrates display 103 appearing on the face of instrument 120 at 199; and display 199 matches the display (103) created originally on PC 101; with display 103's Display Definition having been included (according to the illustrative example being set forth herein) in the Display Library made available to instrument 120.

It should further be noted with reference to FIG. 1 that the programmable devices (such as, PC 101 and instrument 120 depicted in FIG. 1, etc.), used according to a preferred embodiment of the invention for implementing the novel processes to be described in detail hereinafter, constitute examples of apparatus suitable for practicing the invention when properly programmed. Those skilled in the art will readily appreciate how to program devices like PC 101 and instrument 120 to carry out the teachings of the invention after reviewing the details of the aforementioned novel processes described herein.

Finally, with reference to FIG. 1, it should be noted that a commercially available example of an instrument like instrument 120, suitable for providing a processing environment in which the present invention may be practiced, is the aforementioned Leeds & Northrup 25,000 Chart recorder. This example, and the other examples of hardware and software set forth herein, are provided for the sake of illustration only without intending to limit the spirit or scope of the present invention.

Reference should now be made to FIG. 2 which depicts, as indicated hereinbefore, an exemplary Display Library Data file which consists of a Display Library and associate text data (which may include one or more text data language files).

In particular, FIG. 2 depicts Display Library 200 as a collection of one or more (at least one) Display Definition(s), illustrated (for the sake of example only) as Display Definitions 201, 202, 203 and 204; together with a static text library 205 stored in the portion of the Display Library labeled "Text Data".

As defined hereinbefore, each Display Definition is a data set (as opposed to executable code) which is an interpretable collection (or list) of Display Objects. FIG. 2 depicts exemplary Display Definition 204 as a collection of Display Objects 206, 207 and 208.

It should be recalled that a Display Object is defined herein to be a set including one or more of the following types of information: (1) Appearance; (2) Taught Behaviors; (3) Custom Procedural Logic; (4) A Data Source Identifier; and/or (5) Other (contained) Display Objects.

This is illustrated with reference to FIG. 3 which depicts an exemplary Display Definition 300 (which could be any Display Definition contained in a given Display Library), containing exemplary Display Objects 301, 302 and 305; and the contents of exemplary Display Object 301 included in Display Definition 300.

In particular, FIG. 3 illustrates that a Display Object, which can be created and used in accordance with the teachings and stated objects of the invention set forth elsewhere herein, includes the aforementioned (1) Appearance information (shown at 311); (2) Taught Behavior (shown at 312); (3) Custom Procedural Logic (shown at 313); (4) a Data Source Identifier (shown at 314); and (5) a contained Display Object or Objects (shown at 315; and by way of further example Display Objects 303 and 304 contained within Display Object 302), where each type of information that may be included as part of a given Display Object has been previously defined herein.

It should be noted that a Display Object, like Display Object 302, contains multiple Display Objects (such as 303 and 304), when, for example, displays are embedded within other displays (such as where several layers of display menus appear within a given display).

Figure 5:
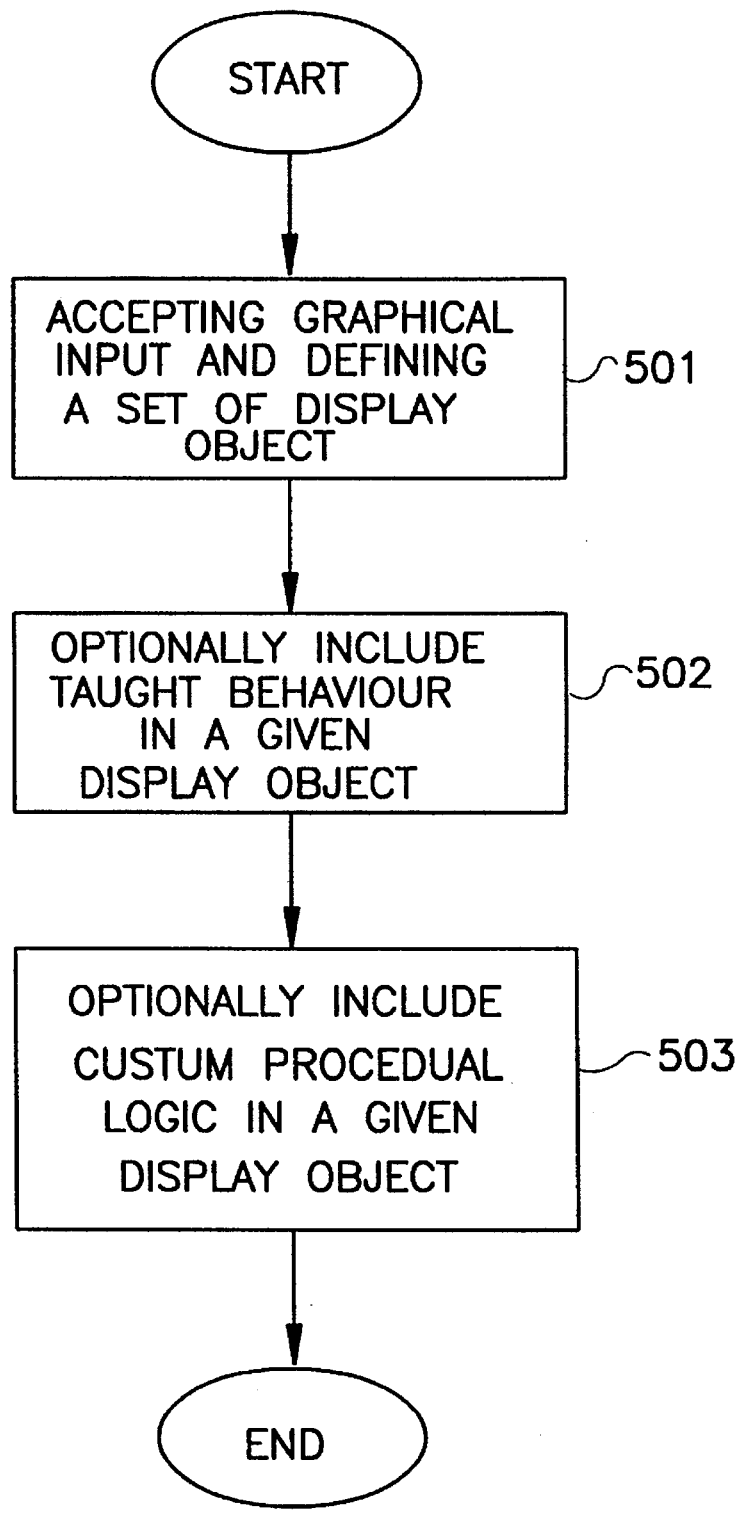
FIG. 5 depicts in the form of a flow chart a more detailed illustration of process steps used, in accordance with a preferred embodiment of the invention, for graphically defining and generating a Display Library.

According to the present invention, Display Libraries, such as the one depicted in FIG. 2; and Display Definitions and Display Objects (such as the one(s) depicted in FIG. 3), may be created according to the exemplary process depicted in FIG. 5.

Figure 4:
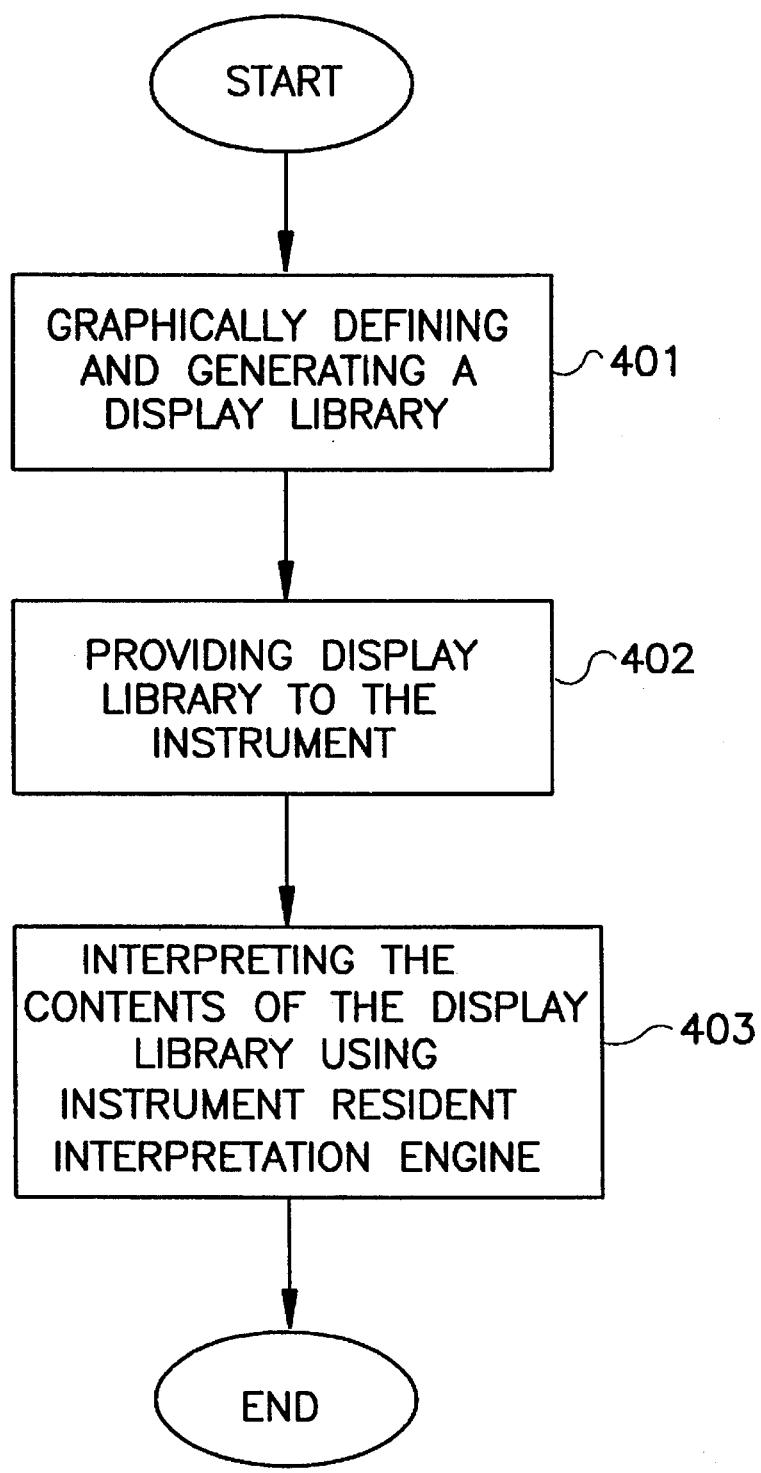
FIG. 4 depicts in the form of a flow chart an overview of a process contemplated by a first aspect of the invention for creating a Display Library suitable for use by a process control and/or process measurement instrument (using a graphical editor), and making the Display Library available for use on an instrument not capable of executing the editor, where an instrument resident interpretation engine, running during the operation of the instrument, is utilized to interpret the contents of the Display Library and render displays.

Before describing the FIG. 5 process steps, reference should first be made to FIG. 4 which, as indicated hereinbefore, depicts (in the form of a flow chart) an overview of one process contemplated by the invention.

In particular, FIG. 4 depicts (in summary form) a process including the following steps: (a) graphically defining and generating a Display Library, utilizing a graphical display editor, wherein the Display Library is suitable for use by a process control and/or process measurement instrument, not capable of executing the graphical display editor (step 401, the details of which, according to one embodiment of the invention, are depicted in and described with reference to FIG. 5); (b) providing the Display Library to an instrument (step 402); and (c) interpreting the contents of the Display Library provided to the instrument, utilizing an interpretation engine resident in the instrument, wherein the interpretation engine runs during the operation of the instrument in order to render a given display (step 403, the details of which, according to one embodiment of the invention, are depicted in and described with reference to FIGS. 6 and 7).

Step 401, when performed using (for example) the aforementioned exemplary Windows based software package to create Data Libraries containing the information taught herein (to drive the "mirror image" interpretation engine referred to hereinbefore), facilitates the interactive creation of the Display Definitions used eventually to generate displays and provide desired operator interfaces.

The step of providing a Display Library to an instrument (step 402), may be performed, according to various alternate embodiments of the invention, using (for example): a Read Only Memory (ROM) device installed in the target instrument; a communication link coupled to the instrument; and/or a removable storage medium (such as a floppy disc) accessible by the instrument.

Step 403, the step of "interpreting" the contents of a Display Library using an instrument resident interpretation engine, will be explained in greater detail with reference to FIGS. 6 and 7, as indicated hereinbefore.

Reference should now be made to FIG. 5 which, as previously indicated, depicts in the form of a flow chart a more detailed illustration of process steps used, in accordance with a preferred embodiment of the invention, for graphically defining and generating a Display Library (step 401 of FIG. 4).

Assuming again, for the sake of illustration only, that the exemplary Windows based software package being used to create Data Libraries containing the information taught herein (providing the user with the ability to "see" and interact on, for example, a PC display while creating Display definitions and operator interfaces); step 501 of the process depicted in FIG. 5 represents the activity of a user interacting with the exemplary software package (which accepts graphical inputs) for the purpose of creating Display Definitions (i.e., defining the set of "Display Objects" referred to at step 501 of FIG. 5) for inclusion in the Display Library being created.

In particular, according to one of many possible scenarios in which a user would interact with a graphical package to create Display Definitions in accordance with the teachings of the invention, the user would select a target screen geometry (i.e., specify the metes and bounds of the screen); specify a display upon the selected screen (i.e., specify the display's location); and then select and place within the specified display location a particular Display Object (i.e., pick the object you want and place it on the screen within the display being created). Those skilled in the art will readily appreciate that all displays in the Display Library being created must have the same target screen geometry.

The steps outlined hereinabove may easily and conveniently be performed using, for example, the aforementioned (commercially available) Windows based software package, following the teachings set forth herein for preferred Display Definition content.

Practicing step 501, according to a preferred embodiment of the invention, enables the user to view and modify what is being created on screen (for ultimate replication on a screen included as part of a target instrument), as a given Display Definition (list of Display Objects) is defined.

Steps 502 and 503 of FIG. 5 are included in the process depicted in FIG. 5 to clearly indicate that, according to a preferred embodiment of the invention, the user may optionally include Taught Behavior (as defined hereinbefore), at step 502 of the depicted process; and/or Custom Procedural Logic (also defined hereinbefore), at step 503 of the depicted process, in a given Display Object as it is being defined (the other elements of a Display Object as defined hereinabove, e.g., Appearance, etc., being required).

Reference should now be made to FIG. 6 which, as indicated previously, depicts in the form of a flow chart a more detailed illustration of process steps used, in accordance with a preferred embodiment of the invention, for interpreting the contents of a Display Library utilizing an instrument resident interpretation engine.

In particular process step 601 in FIG. 6 indicates that the instrument resident interpretation engine contemplated by a preferred embodiment of the invention, functions to cyclically update a given display (at the instrument's display refresh rate), i.e., what one sees; and that (as summarized by step 602) the engine is further responsible for recognizing and interpreting externally generated signals (signals generated externally with respect to the engine itself, such as when an operator depresses a button on an instrument panel, etc.), i.e., determining how the display will react (what it will do) in response to the external input interpreted in conjunction with the contents of the Display Library data file.

If, for example, no buttons are depressed on the target instrument panel, no alarms are signaled, etc.; the process depicted in FIG. 6 would cause the data displayed on the screen to be refreshed each data cycle, over and over again, until some behavior (like a button being depressed) or real time process variable, calls for something else to happen.

As indicated hereinbefore, FIG. 7 which depicts in the form of a flow chart a more detailed illustration of a set of steps that may be used to implement step 602 of FIG. 6, i.e., a more detailed illustration of process steps used, in accordance with a preferred embodiment of the invention, for recognizing and interpreting signals generated external to an instrument resident interpretation engine.

Signals generated external to an instrument resident interpretation engine, as previously mentioned, include: real time data inputs (such as process data per se), user inputs (such as a button on the instrument panel being depressed, etc.), interpreted in conjunction with the contents of the Display Library Data file.

Before reviewing the process steps related to the specific functions of the interpretation engine described with reference to FIG. 7, it should be noted for the sake of completeness that, according to the preferred embodiment of the invention, Inherent Behaviors are implemented through execution of interpretation engine code and are not described in a given Display Definition; whereas Taught Behaviors are described within a given Display Definition and are then implemented, once again, by interpretation engine code.

It should also be recalled that, according to the preferred embodiment of the invention, Taught Behavior overrides i.e., take precedence over, Inherent Behavior.

Furthermore, it should be understood (and those skilled in the art will readily appreciate) that the interpretation engine contemplated by the invention (a) causes a display to be rendered as a function of the contents of the Display Library, including any Inherent Behavior implicit in the definition of Display Objects included in the Display Library (with the interpretation engine actually extracting information as needed from the Display Library); and that (b) the interpretation engine responds to external events (such as an operator pressing a button, process data triggered alarms built into the interpretation engine logic and/or custom procedural logic resident included in a given Display Object, etc. Thus, for example, if some process variable is greater than a predetermined amount; the interpretation engine could cause the word "DANGER" to be displayed, etc.

Referring to FIG. 7, it may be seen that, in accordance with a preferred embodiment of the invention, a suitable set of steps for recognizing and interpreting signals generated external to an instrument resident interpretation engine include: (a) recognizing and processing signals generated external to the interpretation engine, according to any defined Taught Behavior for a given Display Object and any Inherent Behavior implicit in the definition of the given Display Object (step 701); (b) utilizing each Display Object's Data Source Identifier to locate and retrieve real time data to be displayed (step 702); (c) executing any defined Custom Procedural Logic for each Display Object (step 703); and (d) formatting and drawing the retrieved real time data according to its defined Appearance (step 704).

As previously indicated, according to the preferred embodiment of the invention, Taught Behavior takes precedence over said Inherent Behavior in performing said step of recognizing and processing signals generated external to the interpretation engine.

Those skilled in the art will recognize that the foregoing description has been presented for the sake of illustration and description only. It is not intended to be exhaustive or to limit the invention to the precise form disclosed, and obviously many modifications and variations are possible in light of the above teaching.

Figure 8:
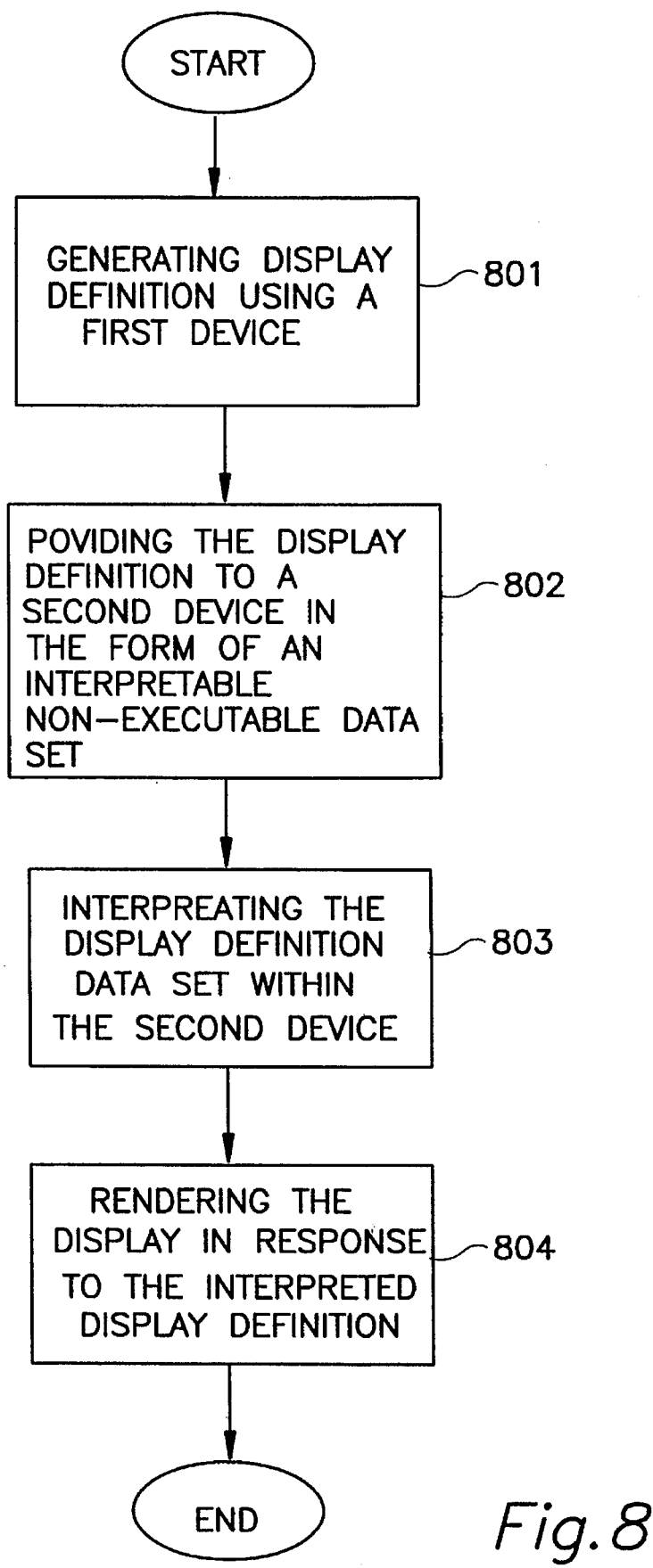
FIG. 8 depicts, in the form of a flow chart, an overview of a process contemplated by an alternate embodiment of the invention.

For example, reference should now be made to FIG. 8 which, as indicated hereinbefore, depicts in the form of a flow chart an overview of a process contemplated by an alternate embodiment of the invention.

In particular, FIG. 8 illustrates an alternate embodiment of the invention that includes the steps of: (a) generating a Display Definition using a first device (at step 801); (b) providing the Display Definition to a second device in the form of an interpretable, non-executable data set (at step 802); (c) interpreting the Display Definition data set provided to the second device (at step 803); and rendering a display in response to the interpreted Display Definition (at step 804).

What has been described in detail hereinabove are methods and apparatus which meet all of the aforestated objectives.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A method for providing display screens and operator interfaces for process control and measurement instruments, comprising the steps of:
   (a) graphically defining and generating a Display Library, utilizing a graphical display editor, wherein said Display Library is suitable for use by process control and process measurement instruments not capable of executing said graphical display editor;
   (b) providing said Display Library to an instrument; and
   (c) interpreting the contents of said Display Library provided to said instrument, utilizing an interpretation engine resident in said instrument, wherein said interpretation engine runs during the operation of said instrument in order to render a given display.

2. A method as set forth in claim 1 wherein the step of interpreting further comprises the steps of:
   (a) cyclically updating the display utilizing real time information available to the instrument; and
   (b) recognizing and processing signals generated external to the interpretation engine, according to any defined Taught Behavior for a given Display Object and any Inherent Behavior implicit in the definition of the given Display Object.

3. A method as set forth in claim 2 wherein said Taught Behavior takes precedence over said Inherent Behavior in performing said step of recognizing and processing signals generated external to the interpretation engine.

4. A method as set forth in claim 2 wherein said step of interpreting for each Display Object being used to render a given display, further comprises the steps of:
   (a) utilizing each Display Object's Data Source Identifier to locate and retrieve real time data to be displayed;
   (b) executing any defined Custom Procedural Logic for each Display Object; and
   (c) formatting and drawing the retrieved real time data according to its defined Appearance.

5. A method as set forth in claim 1 wherein the step of graphically defining and generating a Display Library further comprises the step of accepting graphical input and defining a set of Display Objects in response thereto.

6. A method as set forth in claim 1 wherein the step of graphically defining and generating a Display Library further comprises the step of optionally including Taught Behavior in a given Display Object.

7. A method as set forth in claim 1 wherein the step of graphically defining and generating a Display Library further comprises the step of optionally including Custom Procedural Logic in a given Display Object.

8. A method as set forth in claim 1 wherein said Display Library is provided in the form of a non-executable data set capable of being interpreted independently by the interpretation engine resident in said instrument.

9. A method for providing display screens and operator interfaces for process control and measurement instruments wherein said display screens and operator interfaces are generated on a first device and are subsequently input to and interpreted on a second device, capable of being decoupled from and run independently with respect to said first device, wherein said second device lacks the system resources to support a display editor, comprising the steps of:
   (a) generating a Display Definition utilizing said first device;
   (b) providing said Display Definition to said second device in the form of an interpretable, non-executable data set;
   (c) interpreting said Display Definition within said second device; and
   (d) rendering the desired display in response to Display Definition.

10. A method as set forth in claim 9 further comprising the step of utilizing said first device to provide a text dictionary which is referenced by said Display Definition.

11. A method as set forth in claim 10 wherein said text dictionary is accessible by said second device as part of said interpretable, non-executable data set.

12. A method as set forth in claim 9 further comprising the step of providing at least one additional Display Definition to said second device at any time utilizing a communication link coupled to said second device.

13. A method as set forth in claim 9 further comprising the step of providing at least one additional Display Definition to said second device at any time utilizing a removable storage medium accessible by said second device.

14. Apparatus for providing display screens and operator interfaces for process control and measurement instruments, comprising:
   (a) means for graphically defining and generating a Display Library, including a graphical display editor, wherein said Display Library is suitable for use by process control and process measurement instruments not capable of executing said graphical display editor;
   (b) means for providing said Display Library to an instrument; and
   (c) means for interpreting the contents of said Display Library provided to said instrument, wherein said means for interpreting is resident in said instrument and runs during the operation of said instrument in order to render a given display.

15. Apparatus as set forth in claim 14 wherein said means for providing is a Read Only Memory (ROM) device installed in said instrument.

16. Apparatus as set forth in claim 14 wherein said means for providing is a communication link coupled to said instrument.

17. Apparatus as set forth in claim 14 wherein said means for providing is a removable storage medium accessible by said instrument.

18. A method for providing display screens and operator interfaces for process control and process measurement instruments not capable of executing a graphical display editor, comprising the steps of:
   (a) providing a Display Library to an instrument; and
   (b) interpreting the contents of said Display Library provided to said instrument, utilizing an interpretation engine resident in said instrument, wherein said interpretation engine runs during the operation of said instrument in order to render a given display.

19. A method as set forth in claim 18 wherein the step of interpreting further comprises the steps of:
   (a) cyclically updating the display utilizing real time information available to the instrument; and
   (b) recognizing and processing signals generated external to the interpretation engine, according to any defined Taught Behavior for a given Display Object and any Inherent Behavior implicit in the definition of the given Display Object.

20. A method as set forth in claim 19 wherein said Taught Behavior takes precedence over said Inherent Behavior in performing said step of recognizing and processing signals generated external to the interpretation engine.

21. A method as set forth in claim 19 wherein said step of interpreting for each Display Object being used to render a given display, further comprises the steps of:

(a) utilizing each Display Object's Data Source Identifier to locate and retrieve real time data to be displayed;

(b) executing any defined Custom procedural Logic for each Display Object; and (c) formatting and drawing the retrieved real time data according to its defined Appearance.

* * * * *